US007409523B2

(12) United States Patent
Pudipeddi et al.

(10) Patent No.: US 7,409,523 B2
(45) Date of Patent: Aug. 5, 2008

(54) ONLINE STORAGE VOLUME SHRINK

(75) Inventors: Ravisankar V. Pudipeddi, Bellevue, WA (US); Kevin Y. Seng, Seattle, WA (US); Garret J. Buban, Carnation, WA (US)

(73) Assignee: Microsoft Corporation, Redmond, WA (US)

( * ) Notice: Subject to any disclaimer, the term of this patent is extended or adjusted under 35 U.S.C. 154(b) by 235 days.

(21) Appl. No.: 11/303,419

(22) Filed: Dec. 16, 2005

(65) Prior Publication Data

US 2007/0143563 A1 Jun. 21, 2007

(51) Int. Cl.
*G06F 12/02* (2006.01)
(52) U.S. Cl. .................. 711/173; 711/162; 711/153
(58) Field of Classification Search .......... 711/162, 711/173
See application file for complete search history.

(56) References Cited

U.S. PATENT DOCUMENTS

| 5,109,485 | A | * | 4/1992 | Smith, Jr. ............... 709/213 |
| 6,012,130 | A | | 1/2000 | Beyda |
| 6,023,744 | A | | 2/2000 | Shoroff |
| 6,032,161 | A | | 2/2000 | Fuller |
| 6,088,778 | A | * | 7/2000 | Ruff et al. .................. 711/173 |
| 6,249,792 | B1 | | 6/2001 | Zwilling et al. |
| 6,526,493 | B1 | | 2/2003 | Ding |
| 6,711,656 | B2 | | 3/2004 | Nishio |
| 6,850,959 | B1 | | 2/2005 | Golds |
| 2003/0191911 | A1 | | 10/2003 | Kleinschnitz |
| 2003/0220951 | A1 | | 11/2003 | Muthulingam |
| 2004/0015672 | A1 | | 1/2004 | Masse |
| 2004/0044698 | A1 | | 3/2004 | Ebata |
| 2006/0242397 | A1 | * | 10/2006 | Chen et al. ............... 713/1 |
| 2007/0136516 | A1 | * | 6/2007 | Brondijk ............... 711/111 |

FOREIGN PATENT DOCUMENTS

WO WO2004015522 2/2004

OTHER PUBLICATIONS

Noton PartitionMagic 8.0 User's Guide, 1994-2004, Symantec Corp., pp. i-ii, 54-55.*
7tools Partition Manager 2005, http://www.popularshareware.com/7tools-Partition-Manager-download-5641.html.
Norton Partition Magic; Easily organize your hard drive, http://www.powerquest.com/partitionmagic/.
VCOM Partition Commander(R); Everything you need to safely and easily partition your hard drive!, http://www.v-com/product/Partition_Commander_Home.html.
Chang-Soo, Kim, et al. "Volume Management in SAN Environment" Parallel and Distributed Systems, 2001, ICPADS 2001 Proceedings, Eighth International Conference on Jun. 26-29, 2001, pp. 500-505.

* cited by examiner

*Primary Examiner*—Matt Kim
*Assistant Examiner*—Hetul Patel
(74) *Attorney, Agent, or Firm*—Workman Nydegger

(57) ABSTRACT

Described is a technology by which a new volume or partition may be created on a disk, e.g., by running a shrink program and then reclaiming freed space. Shrink occurs online, while the user or system processes may be otherwise using the disk for reads and writes. Further, the technology operates while protecting snapshot versions of the volume. To shrink, upon receiving a request to shrink a volume to within a boundary, new allocations are restricted such that any allocation is to a volume area within the boundary. Data is moved from outside the boundary to within the boundary, and the shrink is committed when no volume data remains outside the boundary. A reduced-size volume or partition that does not include the specified region is committed when the data has been moved out of the specified region. A new volume or partition may be freed that corresponds to the region.

14 Claims, 4 Drawing Sheets

ONLINE STORAGE VOLUME SHRINK

BACKGROUND

Presently, most personal computers are shipped with a pre-partitioned hard disk drive (disk), with the disk typically having one volume spanning the entire disk. In certain situations, however, another partitioning arrangement is needed. Full-volume encryption is one example of when another partition is needed, namely to provide a recovery partition. Another example is when a user (or administrator) desires to split up a single volume into multiple volumes, such as to cleanly separate certain data.

If another partition is needed, the user needs to back up the volume contents, re-partition the disk as desired and then restore the volume contents. This is a very time-consuming (expensive) and arduous process, and may even risk data loss for users who improperly backup or restore their data.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which users can create free space on a disk, e.g., by running a shrink program and then reclaiming freed space, such as to create a new partition. This occurs online, while the user or system processes may be otherwise using the disk for reads and writes. Further, the technology operates while protecting snapshot versions of the disk, wherein snapshot versions corresponds to states (e.g., copies) of the volume as they existed in the past at various times.

To shrink, upon receiving a request to shrink a volume to within a boundary, any new file system allocations are restricted such that any allocation is to an area of the volume within the boundary. Data is moved from outside the boundary to within the boundary, and the shrink is committed when no volume data remains outside the boundary.

A shrink engine communicates with a file system component to restrict allocations to only be allowed within a specified region of a partition while allowing read operations from any location of the partition. The communication also moves data out of the specified region into another location in the partition. A reduced-size partition that does not include the specified region is committed when the valid data has been moved out of the specified region. A new partition may be freed that corresponds to a region within another partition, by preparing the region, moving data from the region into the other partition, and committing the other partition so as to not include the region when no valid data remains in the region. For example, given a volume, shrink may move the files on the volume towards the beginning of the volume thereby freeing up space for a new partition/volume on the same disk.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Exemplary Operating Environment

Figure 1:
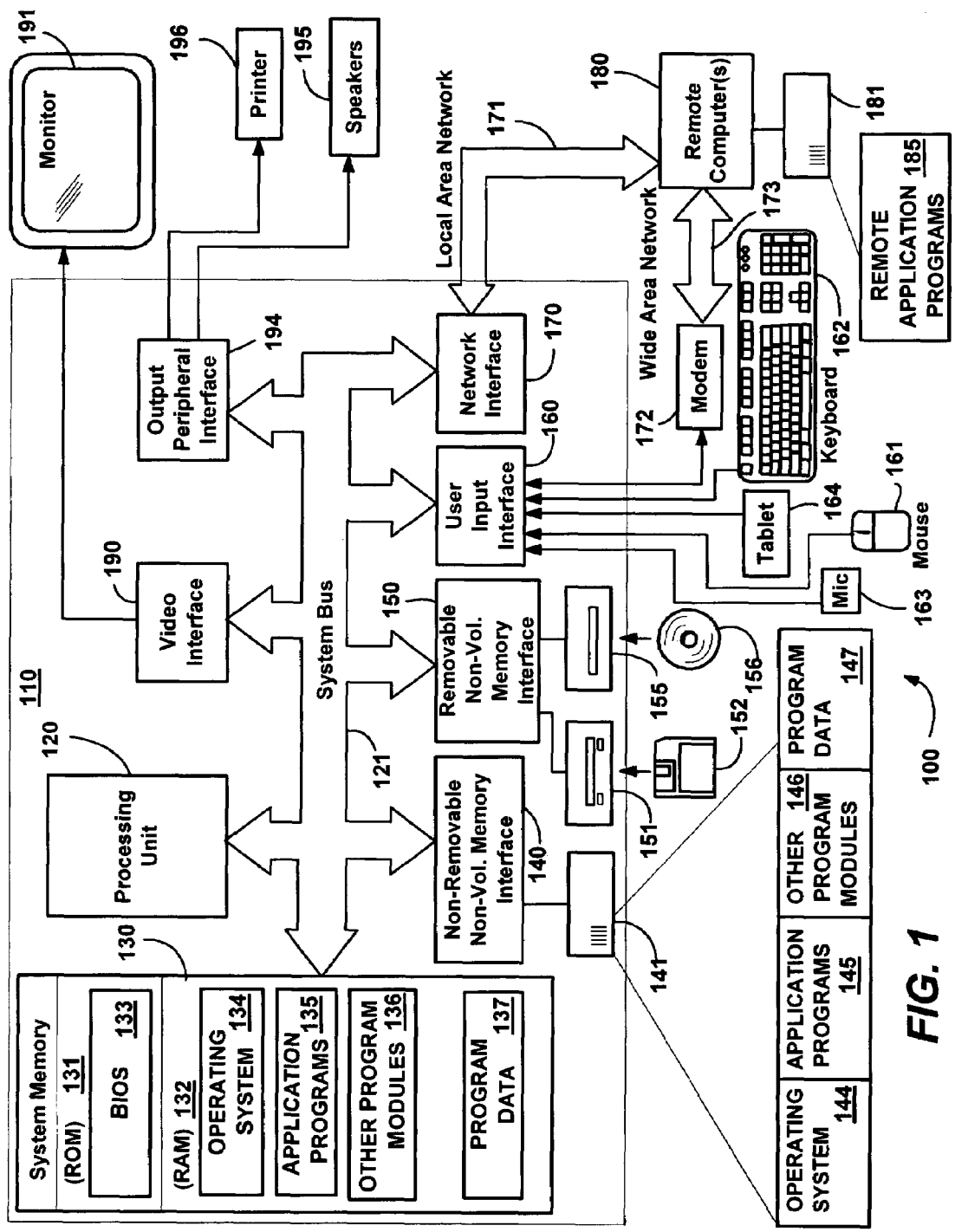
FIG. 1 shows an illustrative example of a general-purpose computing environment into which various aspects of the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise either of two distinctly different types of media: computer storage media or communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. On the other hand, communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It may be appreciated that the network connections shown are exemplary and other means of establishing a communications link between the computers may be used.

Online Volume Shrinking

Various aspects of the technology described herein are directed towards online shrinking of a storage volume, such as to free a partition, wherein as used herein, "shrinking" and its variants (shrink, shrunk and so forth) refers to freeing up disk space. More particularly, online volume shrink refers to a technology (e.g., mechanism/feature) by which users can create free partition-able space on a disk by running the shrink and then re-claiming freed up space to create a new partition. By online, it essentially means that the storage volume is capable of shrinking while still being written to/read from, e.g., in normal usage, that is, shrinking the volume is implemented without affecting I/O and usage of the volume.

In general, the examples herein are directed towards a particular example implementation, with some hypothetical limitations described for purposes of simplicity and brevity. For example, in an example implementation described herein, only or raw (unformatted) volumes or volumes formatted with the Microsoft® NTFS file system are shrunk, even though based upon from the technology described herein, volumes formatted with other file systems may be similarly able to shrink. Note that raw volumes may be shrunk, but are described herein as shrinking without moving data.

As another example, only simple (including basic partitions, spanned and mirrored volumes) are described herein as being shrinkable. Examples of Stripe and RAID-5 volume shrinking are not described herein.

Still further, volumes are typically shrunk only from the end, e.g., given a volume, the shrink mechanism moves files on the volume towards the beginning of the volume, in front of a boundary, thereby freeing up space for a new partition/volume on the same disk. In such an example implementation, the shrink region is a contiguous region on the volume located at the end of the volume. Notwithstanding, in alternative implementations, the shrink region may be located anywhere on the volume, e.g., at the beginning, or somewhere between than the beginning or end, and/or may be non-contiguous. For example, shrink may be used to remove the data from one or more disks from a single storage volume composed of multiple disks. The disk can then be removed. Thus, the term region refers to contiguous as well as non-contiguous locations, while the term boundary may represent a single boundary or a set of bounding points.

Thus, as is understood, the present invention is not limited to the examples used herein. As such, any of the examples mentioned herein are non-limiting, and the present invention may be used various ways that provide benefits and advantages in computing and data storage in general.

Figure 2:
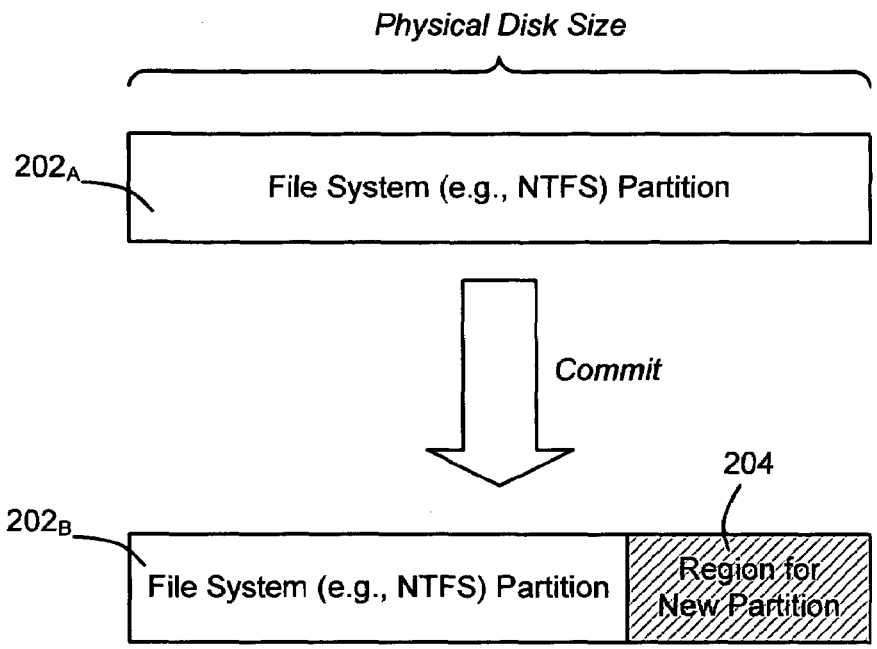
FIG. 2 is a representation of an example partitioning scheme with a file system before and after committing a shrink to provide space for a new partition.

Turning to FIG. 2 of the drawings, there is shown a file system (e.g., NTFS) partition $202_A$ as it may exist prior to any shrink operation, on a storage unit (e.g., hard disk drive) of arbitrary size. In FIG. 2, the file system volume occupies the entire partition 202A, even though as is typical, at a given time much of the partition may be unused space. Following the committing of a shrink operation, as described below, the amount of size consumed by the file system partition $202_B$ is reduced, and a new shrink region 204 is available in the space formerly used by the now-shrunken volume. In general, the shrink region 204 corresponds to the region of the volume that was removed as a result of the shrink.

Figure 3:
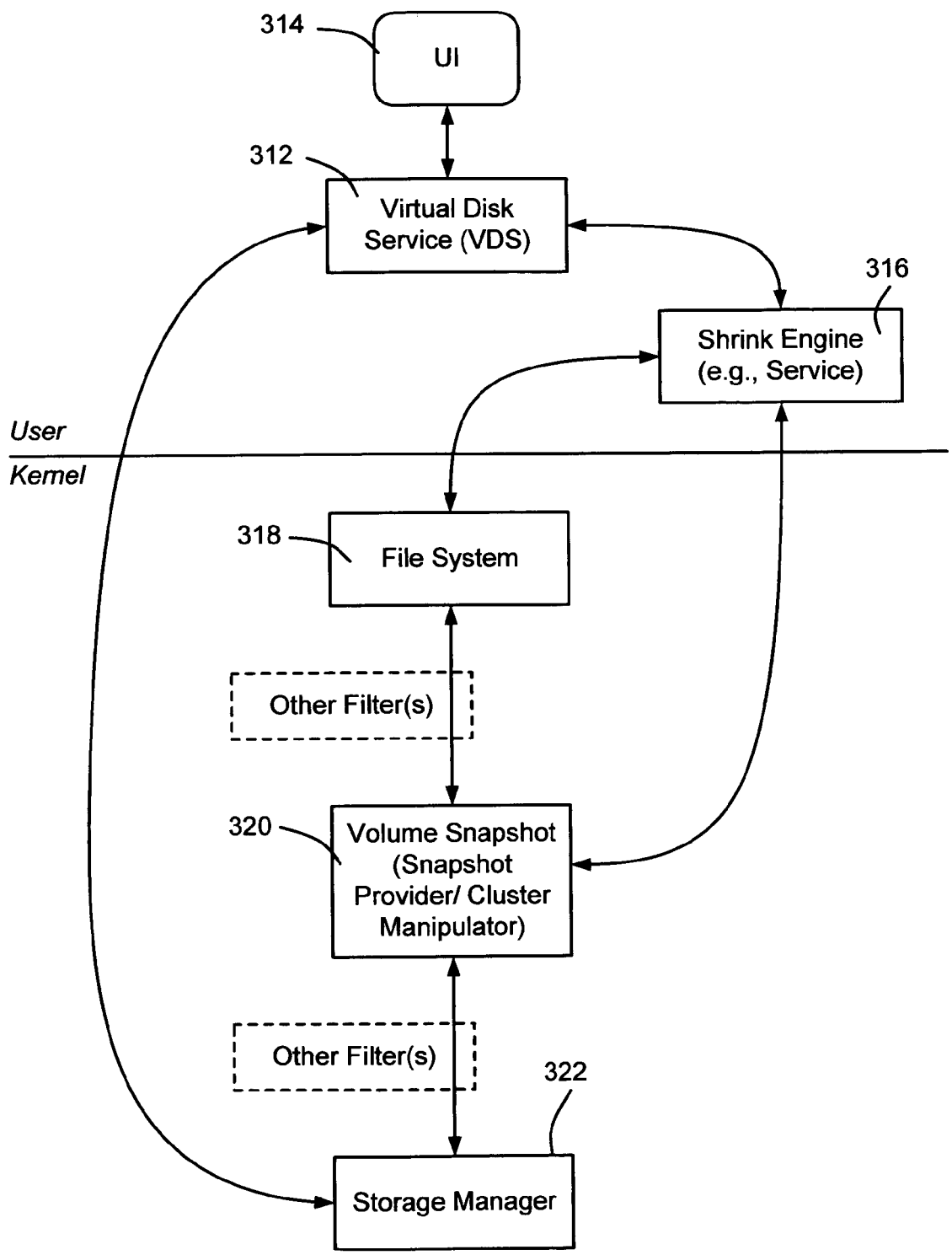
FIG. 3 is a block diagram representing example components that may be involved in performing a shrink operation.

Turning to FIG. 3 of the drawings, there is represented an example embodiment in which a Virtual Disk Service (VDS) 312 provides an application programming interface (API) set by which a user/administrator may manage storage volumes. One of the interfaces provided by the VDS 312 allows a user to request shrinking a volume. More particularly, in this implementation, via a user interface 314, a user calls into the VDS 312 with a desired shrink size. The VDS 312 coordinates with a shrink engine 316, first in order to check to see if the file system can be shrunk by the desired shrink size, and if so, to do the actual shrinking of the file system. After the shrinking of the file system is complete, the VDS 312 then coordinates with a software provider to shrink the actual volume. Basic and dynamic providers support shrink interfaces.

Shrink may be an asynchronous operation, and when asynchronous, the user is able to communicate with the VDS 312 via the user interface 314 to check on the status of the shrink operation, or cancel the shrink operation. The VDS 312 coordinates with the shrink engine 316 for these tasks.

The shrink engine 316 may be implemented as a standalone dll (dynamic link library) that is called into by the VDS 312. Further, the shrink engine 316 may be implemented as a COM component and have a COM interface. The interface between the shrink engine 316 and the VDS 312 may be similar to the interface between the VDS 312 and its providers. The shrink engine 316 may run in the same process of the VDS 312 and may run as Local System. The shrink engine 316 provides the VDS 312 with a method to determine the maximum shrink size and a method to perform the actual file system shrink. Note that the VDS 312, user interface 314 and shrink engine 316 are represented in FIG. 3 as user mode components, however part or all of any of these components may be implemented as kernel mode components.

The shrink engine 316 is in charge of moving the files in the volume out of the shrink region into the remaining part of the volume. Note that on a given existing file system volume, some files may be considered non-moveable. As a result, such files need to be considered when attempting a shrink operation. As used herein, known non-moveable files are files that are always non-moveable, and include the well-known page file (e.g., for virtual memory) and volsnap (volume snapshot) differential area file, (for restoring earlier volume states). Note that known non-moveable files are not the same as files that are marked as non-moveable, as marked non-moveable files may not always be non-moveable. The shrink engine 316 needs to be able to check the maximum shrink size of the volume by querying for the file system free space and checking for all non-moveable files.

The shrink engine 316 also coordinates with the file system 318 (e.g., NTFS, via file system APIs and/or an I/O manager or the like) before and after moving the files out of the shrink region. In one implementation, the shrink engine 316 includes a mechanism that provides progress information about the shrink operation to the VDS 312, and allows canceling a shrink operation.

Figure 4:
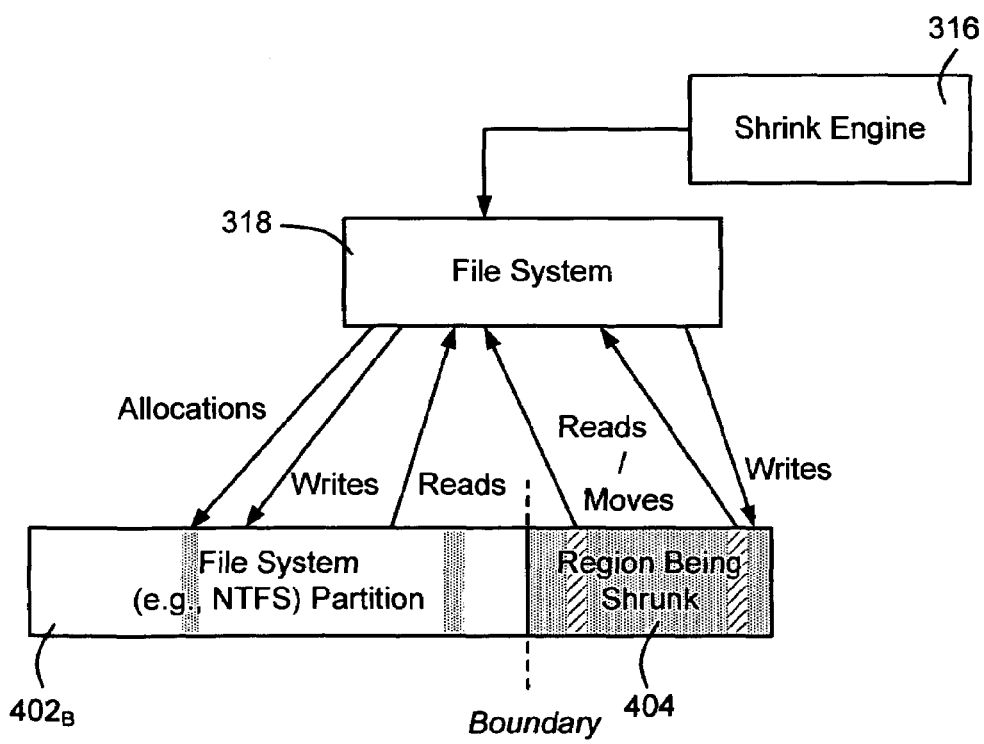
FIG. 4 is a representation of a file system and shrink engine coordinating to move space and restrict allocations to a region before a boundary during an online shrink operation.

FIG. 4 shows these components with respect to a volume undergoing a shrink operation. In general, while the shrink engine 316 is responsible for moving files from the region being shrunk to the reduced-size file system volume, the file system 318 performs the actual (at least logical) moving, and is otherwise involved in the steps of shrinking of the volume. One step performed by the file system 318 restricts any new allocations from being allocated in the region being shrunk 404 (corresponding to the shrink region 204 of FIG. 2 ) while the shrink engine 316 is moving files out of this region 404. In other words, when notified of a shrink operation and provided with the appropriate parameters, the file system 318 ensures that any new allocations are to a location within the reduced-size NTFS partition $402_B$. This facilitates online operation, as normal allocations may occur while the volume is being shrunk, (albeit limited to the reduced-size file system partition $402_B$), without affecting the region 404 being shrunk. Note that a user can still write data to previously allocated space that exists outside the boundary area before that space is moved.

Another step performs the actual size reduction of the file system, e.g., at a commit time. The shrink engine 316 determines when such steps occur and communicates the information to the file system 318. Note that the file system can fail to commit if for any reason valid (e.g. file or snapshot) data still remains in the region to be removed from the file system.

Volume snapshots are a recent technology that essentially allows a copy of a volume at its state at a given "snapshot" point-in-time to be restored. In general, one such volume snapshot mechanism operates by maintaining allocation units (e.g., clusters) of what would be deleted file data or overwritten file data in a differential file. For example, this may be accomplished by copying each block to the differential file in a copy-on-write operation, or by tracking each block as part of the differential file, rather than simply overwriting the block's data when changed or allowing it to be later overwritten if deleted. Because the "changed" and/or "deleted" data is actually still present on the storage device and is associated with a given point-in-time snapshot, the differential file can be used to recreate the volumes. As this technology is relatively well-understood, volume snapshots will not be described herein in detail, except to describe how the volume snapshot operations relate to online volume shrink.

To preserve snapshots after a requested shrink operation, a volume snapshot mechanism (Volsnap) operates to report the differential file area extents, and preserve deleted files in the space being removed from the volume. The deleted files are preserved by copying the deleted files into the differential area file.

Figure 5:
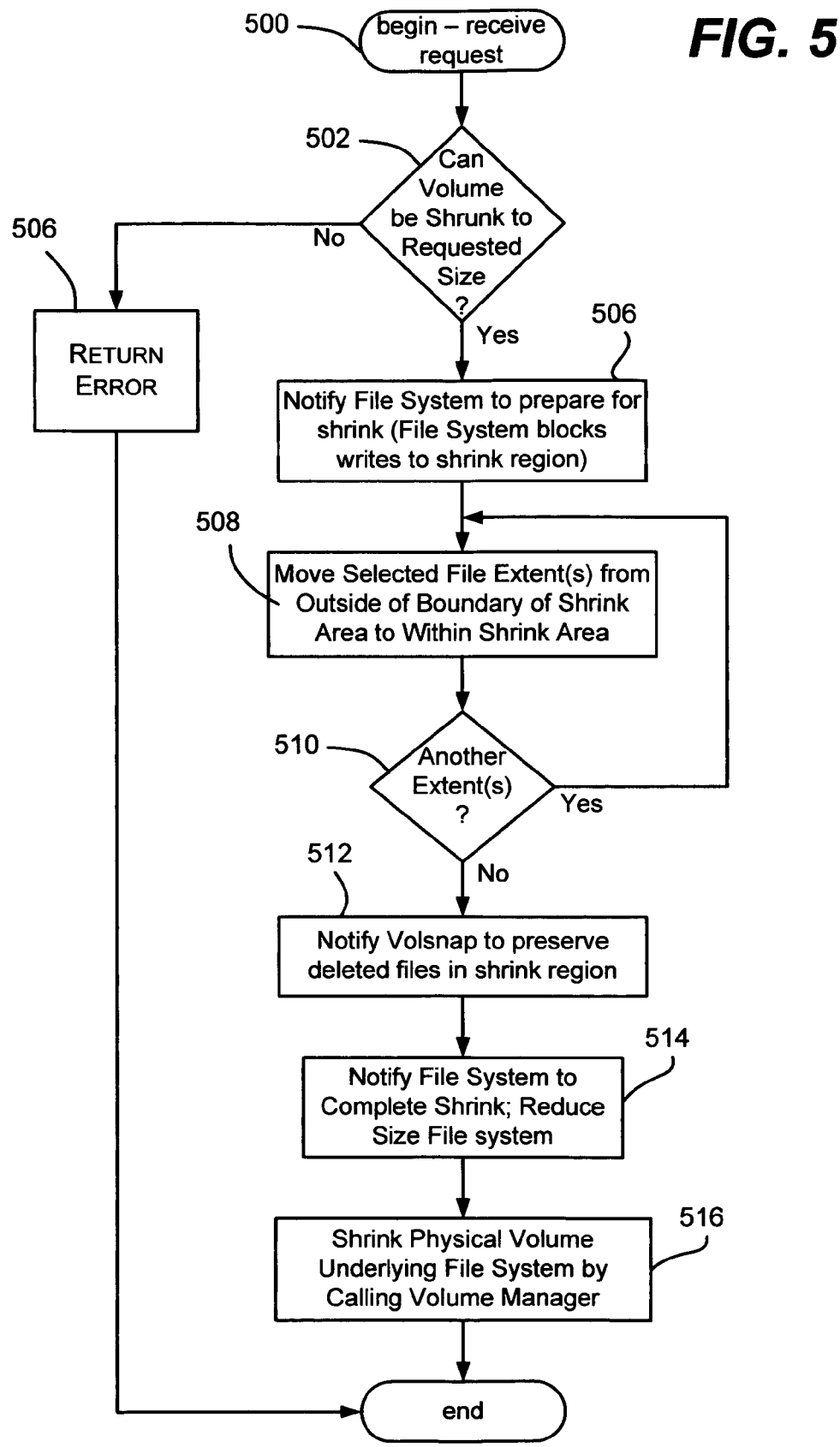
FIG. 5 is a flow diagram including example computer-implemented steps that may be taken to shrink a file system and its underlying volume.

FIG. 5 is a flow diagram that represents some example operations that may be performed during an online volume shrink (e.g., a volume formatted as an NTFS file system volume). Note that while some of the steps of FIG. 5 are performed in the order shown, some steps may be performed in a different order, while other steps may be performed in parallel.

When a request is made to shrink the volume (step 500), a check is made (e.g., via the file system 318) as represented by step 502 to determine based on size, free space and the like as to whether the volume can be shrunk to the requested/specified size. Note that the size may be a range or equivalent, e.g., request that the new partition be a size of N bytes (e.g., corresponding to clusters), but allow the shrink to continue as long as at least N-M bytes are available. If not, at step 504 an errorcode or the like is returned to the caller, and typically back to the user interface 314 of FIG. 3 (but possibly to some automated process that initiated the shrink), whereby the user or process can determine another course of action, such as to request that less space be freed. Still further, compression of some data may be selected to provide the needed space, which can be controlled by the shrink mechanism when chosen.

More particularly, when checking to see if the volume can be shrunk to the specified size, the check is done by finding the maximum shrink size as described above, except without subtracting the shrink buffer. A comparison is then made of the maximum shrink size to the user's inputted minimum shrink size, to determine the amount that the shrink engine 316 will try to shrink.

If the maximum shrink size is smaller than the client's specified minimum shrink size, the call is failed because the volume cannot be shrunk to meet the client's specified requirements. Conversely, if the maximum shrink size is greater than the specified desired size, it is possible to shrink the volume by the user's desired shrink size, whereby the shrink engine 316 will continue in its attempt to shrink the volume as desired.

If the maximum shrink size is less than the desired shrink size and greater than the minimum shrink size, the volume may be shrunk, but not to the user's desired shrink size. In one implementation, because it has already been determined that the desired shrink size is not possible, the shrink engine 316 will try to shrink the volume to the maximum shrink size instead of the user's desired shrink size.

If sufficient space is available, step 506 is performed, which represents notifying the file system to prepare for a shrink. When notified, the file system will thereafter block allocations to the shrink region, e.g., by restricting allocations to be allocated within the reduced-size file system partition $402_B$. Note that any writes in progress can be completed and later moved, since movement from the region being shrunk 404 may be handled in a subsequent step. In an example NTFS implementation, when notifying the file system to prepare for a shrink, a Call is made into FST-CL_SHRINK_VOLUME with the ShrinkPrepare request, passing the size by which the engine will try to shrink, e.g., as determined via step 502.

Steps 508 and 510 represent moving the file extents that are outside of the boundary of the currently-being-reduced file system partition area 402B to be within the boundary. A single extent may be moved at a time, or one or more extents may be moved as a set.

To move the file extents that are outside of the boundary of the shrink area to be within the reduced file system shrink area, FSTCL_SHRINK_VOLUME with the ShrinkPrepare request may be repeatedly called, passing in an updated shrink boundary. This happens when the algorithm encounters clusters in the shrink region which it cannot move.

There may be multiple phases in the shrink algorithm. For example, two such phases comprise a first phase of moving contiguous file extents forward, followed by a brute force phase. The first phase attempts to move contiguous files extents in the shrink region into free space within the new volume region in descending order of extent size. This step tries to preserve the current state of fragmentation in the volume by not fragmenting any file extents which are currently not fragmented. The brute force phase attempts to consolidate any allocated clusters to the front of the volume. In the brute force phase, there may be no attempt to defragment files or to keep contiguous file extents contiguous.

Note that because new allocation requests may be coming into the file system, it is possible for the specified reduced file system partition 402B to not have enough room for the extent moves, (and/or for the volume snapshot data, described below). In such an event the shrink will fail, although again, the user can provide a minimum value or the like corresponding to an adjusted boundary by which the desired new partition size may be contracted without the operation being considered a failure.

Following moving the extents, the volume snapshot mechanism is notified to preserve the deleted files in the shrink region, as represented via step 512. Again, the shrink may fail due to the size change, however the chances of failure may be reduced by including size information from the volume snapshot mechanism in the evaluation of step 502. In an example implementation, the volume snapshot mechanism is notified to preserve the deleted files in the shrink region by calling into IOCTL_VOLSNAP_PRESERVE_SNAPSHOT_SHRINK_REGION with the known shrink boundary. As described below, this boundary is the greater of either the desired shrink boundary or the LCN (logical cluster number) of the allocated cluster with the greatest LCN.

Note that the above operations attempt to preserve or improve defragmentation by moving large files first. However, it is possible to favor defragmentation for the volume snapshots, such as by leaving contiguous free space in anticipation of its use with respect to volume snapshot data. The user can also defragment after shrink, and defragmentation can be automated following shrink.

Following preservation of the otherwise deleted/overwritten files and data at step 512, step 514 operates to notify the file system 318 to complete the shrink of the file system. In an example NTFS implementation, NTFS is notified to complete the shrink of the file system by calling into FSCTL_SHRINK_VOLUME with the ShrinkCommit request. NTFS will try to shrink the volume to the size specified by the most recent ShrinkPrepare request.

Thereafter, the physical volume underlying the file system is shrunk by calling into a storage (e.g., volume) manager 322 (FIG. 3), as represented via step 516.

To summarize via the components in FIG. 3, the shrink is initiated by a client (e.g., the UI 314) using the VDS 312. When a shrink is initiated, the VDS 312 calls into the shrink engine 316 which works with the file system 318 to shrink the file system volume. After the file system is shrunk, the VDS 312 calls the storage manager 322 to shrink the underlying volume. As can be readily appreciated, steps 502-514 are preformed in association with the file system on the volume, and are coordinated by requests from the shrink engine 316. Step 516 deals with the actual volume, and is handled by the VDS 312 and its providers. Note that only step 516 needs to be performed for a raw volume.

During the shrink operation, a cancellation may occur at anytime. When a cancellation occurs, the volume and file system need to be at their original sizes. Thus, if the cancellation occurs after the file system is shrunk, the shrink operation needs to extend the file system back to its original size. Also, if the file system has already been notified to prepare to shrink, the file system 318 will revert back to its original state. Note that files need not be moved back to their original locations on the volume, since the actual physical locations are something that have always been hidden from the user by the file system.

Moreover, in the event of a cancellation or system crash or the like (e.g., power outage) prior to a commit, none of the volume's data is lost. To this end, data structures (described below) that are used in the shrink operation are maintained as in memory structures, whereby the data structures disappear if a reboot is needed, for example. As a result, the volume remains unchanged for any operation not yet attempted. Actual moves are performed as a transaction, and thus any crash in the middle of a move may be undone, using typical undo/redo recovery techniques. Note that any successfully moved data need not be moved back, as the file system has already remapped the data to a different set of cluster location or locations, and the actual location of the data is invisible to the user.

Example Methods and Functions

The following describes various example methods that are exposed to a user to shrink a volume. The example methods are part of an IVdsVolume interface, which is implemented on the VDS volume object 312 (FIG. 3).

QueryMaxReclaimableBytes

This method returns the maximum number of bytes which can be salvaged from the current volume. The maximize bytes which can reused from a volume may be based upon:

The amount of free space on the volume; only free space can be removed from a volume, therefore the maximum space that can be removed from the volume is equal to the amount of free space.

The location of known non-moveable files in the file system; certain files within the volume cannot be moved, and since (in one implementation) a volume needs to be contiguous, a volume can only be shrunk to the end of the known non-moveable file having the greatest volume offset.

A default percentage of the remaining volume; after subtracting the reclaimable space determined by the above steps, the result is subtracted from the reclaimable space to get the maximum usable space.

This is one way to advise the user not to reuse all the space from the original volume and end up with a volume having little if any available space.

Example Function:

```
HRESULT QueryMaxReclaimableBytes(
    [out] ULONGLONG* pMaxNumberOfReclaimableBytes
);
```

Parameters:

pMaxNumberOfReclaimableBytes—Returns the maximum number of bytes which can be reused from the volume.

Note that the differential area may grow due to copy-on-writes that are pending. To provide for such growth, a buffer may be used in determining the reclaimable bytes, e.g., to allow for ten percent differential area growth. However, it is alternatively feasible to get a more accurate estimate based on data maintained by the volume snapshot mechanism, e.g., a copy-on-write bitmap which can be retrieved from the volume snapshot mechanism by calling a function, IOCTL_VOLSNAP_QUERY_COPY_FREE_BITMAP. The copy-on-write bitmap returned by the volume snapshot mechanism shows the copy-on-write clusters that are currently on the volume. Based on a given shrink boundary the differential area growth may be estimated by the following equation:

Max Differential area Growth=size of copy-on-write clusters beyond the shrink boundary+Min(size of allocated clusters beyond shrink boundary, size of copy-on-write clusters before shrink boundary)

The first half of the equation is from the fact that the differential area will grow by at least the size of the copy-on-write clusters beyond the shrink boundary. This is because the operation is reclaiming this space, and the copy-on-write region will no longer be available for reads; therefore the copy-on-write region needs to be copied into the differential area.

The second half of the equation is the result of moving allocated clusters that exist beyond the shrink boundary to copy-on-write clusters before the shrink boundary. The maximum differential area growth that this can cause is the size of allocated clusters beyond the shrink boundary (e.g., all the allocated clusters are moved into copy-on-write clusters) or the size of copy-on-write clusters before the shrink boundary (e.g., all the copy-on-write clusters have an allocated cluster moved into it).

For performance, the shrink engine 316 tries to minimize the amount of differential area growth resulting from the file moves that are occurring. The shrink engine 316 does this by ensuring that each extent being moved is moved to a position within a given free space which has the same volume snapshot cluster alignment. Note that this is the same optimization that the well-known defragmentation engine uses.

In general, the shrink engine 316 only applies this alignment optimization in the first half of the shrink algorithm, where it is attempting to move entire contiguous extents forward. The optimization is not applied during the brute force part of the operation, as described above.

As also described above, when a shrink method begins a shrink operation to shrink a volume by a specified size, the shrink operation shrinks the file system, and then, after the file system is successfully shrunk, the shrink operation shrinks the underlying volume. The shrink operation is typically an asynchronous operation, because it can take a significant amount of time to complete. The operation can be cancelled at anytime. When a cancel occurs, the volume and file system remain their original sizes, that is, the size before the shrink method was called.

Example Function:

```
HRESULT Shrink(
        [in] ULONGLONG DesiredNumberOfReclaimableBytes,
        [in] ULONGLONG MinNumberOfReclaimableBytes,
        [out] IVdsAsync** ppAsync
);
```

Parameters:

DesiredNumberOfReclaimableBytes—Specifies the maximum amount of bytes to remove from the volume. The shrink engine attempts to shrink the volume by this amount.

MinNumberOfReclaimableBytes—Specifies the minimum amount of bytes which may be acceptable to remove from the volume. If the final shrink size is less than this, the call to shrink will fail. This should always be less than or equal to the DesiredNumberOfReclaimableBytes.

ppAsync—Returns a pointer to an IVdsAsync interface pointer which allows users to query the status of, wait on or cancel the shrink operation.

Output:

The Async object returns the final number of bytes removed from the volume. This value may be returned in the VDS_ASYNC_OUTPUT structure which is returned by the IVdsAsync::Wait( ) method.

```
typedef struct _the VDS_ASYNC_OUTPUT {
        the VDS_ASYNC_OUTPUT_TYPE type;
        union {
                ...
                struct {
                        ULONGLONG      ullReclaimedBytes;
                } shrink;
                ...
        };
} the VDS_ASYNC_OUTPUT;
typedef enum
{
        ...
        the VDS_ASYNCOUT_SHRINKVOLUME = 3
        ...
} the VDS_ASYNC_OUTPUT_TYPE;
```

Example interface definitions:

```
interface IShrinkEngine : IUnknown
{
    HRESULT QueryMaxReclaimableBytes(
            [in] LPWSTR pwszVolumeName,
            [out] ULONGLONG* pMaxNumberOfReclaimableBytes
    );
    HRESULT Shrink(
            [in] LPWSTR pwszVolumeName,
            [in] the VDS 312_OBJECT_ID volumeId,
            [in] ULONGLONG DesiredNumberOfReclaimableBytes,
            [in] ULONGLONG MinNumberOfReclaimableBytes,
            [out] IVdsAsync** ppAsync
    );
```

```
-continued

HRESULT Advise(
            [in] IVdsAdviseSink* pSink,
            [out] DWORD* pdwCookie
    );
    HRESULT Unadvise(
            [in] DWORD dwCookie
    );
}
```

The shrink engine 316 may also utilize interfaces declared in the example VDS 312. The IVdsAsync interfaces support the asynchronous operation of shrink.

```
interface IVdsAsync : IUnknown
{
    [helpstring("method Cancel")]
    HRESULT Cancel(
            void
    );
    [helpstring("method Wait")]
    HRESULT Wait(
            [out] HRESULT *pHrResult,
            [out] the VDS_ASYNC_OUTPUT *pAsyncOut
    );
    [helpstring("method QueryStatus")]
    HRESULT QueryStatus(
            [out] HRESULT *pHrResult,
            [out] ULONG *pulPercentCompleted
    );
}
```

The Shrink engine 316 may call into the IVdsAdviseSink interface in order to send notifications about the shrink progress to the VDS 312:

```
interface IVdsAdviseSink : IUnknown
{
    [helpstring("method OnNotify")]
    HRESULT OnNotify(
            [in,range(1,100)] LONG lNumberOfNotifications,
            [in, size_is(lNumberOfNotifications)]
                    the VDS 312_NOTIFICATION
    *pNotificationArray
    );
}
```

The shrink size specified by the user is the number of bytes to remove from the volume. In NTFS, this value needs to be converted to a number of clusters, since operations done in an NTFS file system are cluster based; other file systems may have different allocation units. The number of clusters to remove is determined by dividing the shrink size by the file system cluster size and rounding up. This guarantees to the client that the amount removed from the volume may be at least the amount specified. The shrink volume boundary is equal to the total number of clusters in the volume subtracted by the number of clusters to remove.

The QueryMaxReclaimableBytes method returns the maximum amount the volume can be shrunk at this particular point in time. This value can change at any point after this value is returned, because the volume is online and its state can thus change. The maximum number of reclaimable bytes may be determined by the amount of free space on the volume and the location of non-moveable file clusters on the volume.

The amount of free space on the volume may be found by using the FileFsSizeInformation class. This will return the total number of unallocated clusters on the volume. This value is ideally the maximum amount by which the volume can be shrunk, e.g., if all the unallocated clusters were able to be moved to the end of the volume. Non-moveable files of concern comprise the page files and the differential area files; other files such as the file system's metadata are also unmovable. A non-movable file may be found by trying to move it to see if the move fails, although other ways of locating such files (e.g., via file records) are also feasible. File name comparisons may be performed for known non-movable files; page files may be found by comparing the file record name with the names in the PagingFiles registry key or the like, e.g., SYSTEM\CurrentControlSet\Control\Session Manager\Memory Management\PagingFiles in a Windows®-based operating system. The volume snapshot mechanism may be used to find the differential area extent having the greatest offset.

The extents for these files may be compared to find the extent which occupies the cluster with the greatest logical cluster number (LCN). Subtracting this LCN from the total number of clusters in the volume results in the maximum number of clusters which can be removed from the volume based on the non-moveable extents. To find the differential area extent that occupies the cluster with the greatest LCN, IOCTL_VOLSNAP_QUERY_MINIMUM_SHRINK_SIZE may be used.

The minimum value of the two values found above may then be used, possibly along with subtracting some percentage e.g., ten percent) of the remaining size of the volume from this value. The value is converted back to bytes and returned to the user. Note that as described above, in one alternative implementation, the deduction of the returned value is computed to leave some approximate space for potential differential area file growth resulting from the shrink.

Example Function

```
HRESULT QueryMaxReclaimableBytes(
    [in] LPWSTR pwszVolumeName,
    [out] ULONGLONG* pMaxNumberOfReclaimableBytes
);
```

Parameters pwszVolumeName—Specifies the name of the volume to query the max shrink size on.

pMaxNumberOfReclaimableBytes—Returns the maximum number of reclaimable bytes.

The Shrink method attempts to move the file extents in the shrink region into the remaining volume. Note that the well-known defragmentation engine behaves somewhat similarly in that it tries to move all files in the file system towards the front of the disk, however unlike the shrink engine, the defragmentation engine is not given a boundary within which to move the files. Because the shrink engine 316 is given such a boundary, (the user specified shrink size), the defragmentation engine's methods cannot be used directly.

Example Function

```
HRESULT Shrink(
    [in] LPWSTR pwszVolumeName,
    [in] the VDS 312_OBJECT_ID volumeId,
    [in] ULONGLONG DesiredNumberOfReclaimableBytes,
    [in] ULONGLONG MinNumberOfReclaimableBytes,
    [out] IVdsAsync** ppAsync
);
```

Parameters pwszVolumeName—Specifies the volume to shrink volumeId—Specifies the VDS volume ID of the volume to be shrunk. This may be used by the shrink engine when it sends back the VDS notifications about the volume's shrink progress.

DesiredNumberOfReclaimableBytes—Specifies the desired amount of bytes to remove from the volume and reuse. The shrink engine will try to shrink by this amount.

MinNumberOfReclaimableBytes—Specifies the minimum amount of bytes which may be acceptable to remove and reuse from the volume. If the shrink size is less than this, the call to shrink will fail.

ppAsync—Returns the address of an IVdsAsync interface pointer which can be used to manage the shrink operation while it is running asynchronously.

As described above with reference to FIG. 5, the shrink operation generally checks for space, restricts new allocations, moves the extents and communicates with the snapshot mechanism to preserve deleted data, and then reduces the file system size and the underlying volume size. At this point the file system has either been shrunk by some amount which is within the shrink amount range specified by the user, or it has not been shrunk since it could not be shrunk within the user's specified range. The Shrink engine 316 will then notify the asynchronous interface that the shrink operation is complete and return the actual number of bytes removed from the file system.

In a move-to-front to free space at the end example, a goal of the shrink operation is to move any allocated clusters with an LCN greater than the desired shrink region boundary LCN to some cluster with an LCN less that the desired shrink region boundary. Also when shrinking the volume, an attempt is made to not fragment any additional files. Note that the shrink region boundary was determined when the Shrink engine 316 checks to see if the volume can be shrunk by the specified size.

In one example implementation, the shrink algorithms rely on the creation of a file extent list to keep track of what needs to be moved. The extent lists may be implemented as an AVL tree which allows the list to be easily sorted based on a specified index. The list may contain an entry for each file extent which has a start LCN greater than the shrink boundary.

Below is an example structure for a file extent entry:

```
typedef struct _FILE_EXTENT_ENTRY {
    ULONGLONG    ParentFileRecordNumber;
    ULONGLONG    StartVcn;
    ULONGLONG    StartLcn;
    ULONGLONG    ClusterCount;
} FILE_EXTENT_ENTRY, *PFILE_EXTENT_ENTRY;
```

The list may be built using FSCTL_ENUM_USN_DATA or the like. For each file, the file's extents are obtained using FSCTL_GET_RETRIEVAL_POINTERS. For each extent, a check is made to see if its start LCN is greater or equal to the shrink boundary. If it is, a file extent entry is created for the extent and added to the list.

The shrink algorithms may also construct and use a list of free space regions on the volume. The free space list may be built by using the volume bitmap, and may also be implemented as an AVL tree. In general, the list contains an entry for each free space region found on the volume.

Below is the structure for a free space entry:

```
typedef struct _FREE_SPACE_ENTRY {
    ULONGLONG    StartingLcn;
    ULONGLONG    ClusterCount;
} FREE_SPACE_ENTRY, *PFREE_SPACE_ENTRY;
```

The list may be built by obtaining the volume bitmap using FSCTL_GET_VOLUME_BITMAP. When getting the volume bitmap, the call may specify how much of the volume bitmap to retrieve. For example, the call may specify that only the bitmap for the remaining volume region is desired, not the shrink region. With the bitmap, the process scans through the bitmap looking for regions of unallocated clusters. A free space entry is created for each region found, and added to the list.

To perform the shrink procedure by moving contiguous allocations forward in the first phase, the file extent list is created and the file extent entries sorted by the extent size from largest to smallest. If this step fails, the shrink operation is failed. The free space list is created, and the free space region entries sorted by the region size from smallest to largest. When creating the free space list, the process will only search for free space from the start of the volume to the shrink boundary. If this step fails, the shrink operation is failed.

The process then iterates over the file extent list and iterates over the free space list starting from the current list index. If the index is not set, the process starts from the beginning of the list, and stops when it finds a free space region large enough to hold the entire contiguous extent, or when there are no more free space regions.

If a large enough region is found for the file extent, the file extent is moved into the found region. For example, the file extent may be moved via FSCTL_MOVE_FILE, passing in the starting VCN of the file extent and the starting LCN of the free space region. If this fails because of insufficient space, the process goes back and looks for the next available free space region. Also if the file move fails some number (e.g., five) times because of insufficient space, the process returns to re-create the free space region list, since the volume free space state may have changed.

If the MOVE_FILE call fails, this means that the file is marked as unmovable. In this case, the file is skipped, and the process advances to the next file in the list.

The file extent entry is removed from the file extent list, and the free space region entry is removed. The entry is updated with the new size and starting LCN information, and the updated entry reinserted into the free space region list. If there are no more file extent entries, the process skips the brute force approach.

As described above, a second phase of moving the extents comprises a brute force phase. In this phase, a new free space list is created and sorted by LCN from lowest to highest. The free space list covers the entire volume including the shrink region. The index on the file extent list is reset to the beginning of the list.

To iterate over file extent list, the next free space region is obtained from the free space list. If the free space region LCN is greater than the extent's LCN, the extent entry is removed from the list, and the next extent selected, since this extent cannot be moved any closer to the front of the volume. Otherwise, as much of the extent as possible is moved into the free space region. To determine how much of the extent can be moved into the free space region, e.g., (=Min(extent size, free space region size)) the determined amount of the extent is moved to the free space region using FSCTL_MOVE_FILE. If this fails because of insufficient space, the process goes back to look for the next available free space region. Also, if the file move fails some number (e.g., five) times because of insufficient space, the process returns to re-create the free space region list, since the volume free space state may have changed.

If the move fails because the file is marked as unmovable, the current file is skipped and the next file in the list is selected. To update the free space region entry, if the entire region was used, the free space region entry is removed from the list, otherwise the region entry's start LCN and cluster count is updated. If the entire extent was moved, this extent entry is removed from the list, and the next extent is selected. Otherwise, the extent information is updated with the new starting LCN and extent length. The process then gets the next free region to move the rest of the extent into it.

At this point, the movable clusters in the volume that were in the shrink region have been moved up as close to the front of the volume as possible.

Note that large files to be moved may be broken up into smaller move files. This allows for cancellations to occur while large files are being moved within the volume without having to wait for completion of the move.

With respect to snapshot performance, the shrink engine 316 tries to minimize the amount of differential area growth resulting from the move files that are occurring. The shrink engine 316 does this by ensuring that the extent being moved is moved to position within a given free space which has the same volsnap cluster alignment (e.g., similar to an optimization that defragmentation performs). The shrink engine 316 only applies this alignment optimization in the first half of the shrink algorithm where it is attempting to move entire contiguous extents forward. The optimization is not applied during the brute force part of the algorithm.

As described above, for reasons including user interface purposes, the Shrink method may be implemented as an asynchronous implementation, and when called will pass back a pointer to an IVdsAsync interface. This is the same interface which the VDS 312 currently uses. The interface allows a client to cancel, wait and get progress on the current shrink operation.

To cancel, before each call to MOVE_FILE, the shrink engine 316 will check to see if a cancel request has been made. If there is a cancel request the Shrink engine 316 will call FSCTL_SHRINK_VOLUME with an abort request, perform regular internal cleanup (clean up data structures, open handles, and so forth), and signal the asynchronous object that the operation is complete. Essentially, in addition to cleanup, an abort removes the allocation restriction whereby future allocations may be made to the previously-restricted region.

With respect to notifications, the shrink engine 316 will send notifications about the ongoing shrink operations. The notification sending mechanism may be the same callback interface that the VDS 312 is currently using, e.g., the IVdsAdvise interface. The VDS 312 registers for the notifications using the IShrinkEngine::Advise( ) method. The Shrink engine 316 will send the VDS_VOLUME_NOTIFICATION structures to notify the VDS 312 of the shrink progress:

```
typedef struct _the VDS_VOLUME_NOTIFICATION {
    ULONG ulEvent;
    the VDS_OBJECT_ID volumeId;
    the VDS_OBJECT_ID plexId;
```

-continued

```
    ULONG ulPercentcompleted;
} the VDS_VOLUME_NOTIFICATION;
```

A new value may be added to the notification event enumeration:
const ULONG VDS_NF_FILE_SYSTEM_SHRINKING_PROGRESS=14;

The volumeId may be set to the VDS volume ID for the volume undergoing the shrink. The VDS 312 passes this ID in when it calls into the shrink engine's shrink method.

Progress may be measured by the number of files acted on that have extents in the shrink region. To this end, when the original file list is created, the number of files in the list may be stored. As each file in the list gets acted on through the shrink algorithm, the progress may be updated. Note that this is not based on the number of files moved. Alternatively, progress may be measured by cluster count or the like instead of file count, to provide a more realistic indication, in that cluster counts are independent of file sizes. It may not be possible to move all the files that need to be moved, however shrink still needs to reach completion. To reduce the number of notifications, some threshold amount of progress may be required, e.g., a notification may be sent every time an additional X percent (e.g., one percent) of the files have been acted upon.

In the examples herein, only a single instance of shrink/defragmentation is described as being run on a volume at a given time. Note that this is only for simplicity, as multiple processes can shrink a volume at the same time, as set forth below, however this would likely not be a typical usage pattern. If desired to prevent such multiple simultaneous shrinking behavior, when a user attempts to call shrink on a volume that is already being shrunk (or otherwise subject to a restricted operation, such as defragmented), then the call to shrink is failed gracefully, e.g., with an error code that notifies the user that shrink cannot be run on the volume at this time.

In an example NTFS implementation, the following FSCTL may be implemented to support the shrink operation:

---
FSCTL_SHRINK_VOLUME
---

Input
```
    typedef enum _SHRINK_VOLUME_REQUEST_TYPES
    {
        ShrinkPrepare = 1,
        ShrinkCommit,
        ShrinkAbort
    } SHRINK_VOLUME_REQUEST_TYPES,
    *PSHRINK_VOLUME_REQUEST_TYPES;
    typedef struct _SHRINK_VOLUME_INFORMATION
    {
        SHRINK_VOLUME_REQUEST_TYPES RequestType;
        LONGLONG NewNumberOfSectors;
    }
```
Output The FSCTL prepares the NTFS file system on the volume for a shrink, and also changes the actual size of the file system. When only one shrink operation can be done on a volume at a time, subsequent requests to shrink the volume will fail. In such a situation, the file system tracks the shrink operation requests by handle. Calls to prepare, commit and abort for a given shrink operation are made on the same volume handle. Notwithstanding, in an alternative implementation, multiple shrink operations may be concurrent, e.g., via different processes/handles. To avoid conflict-type situations such as where the free space of one process is actually the space being freed by another, and also to avoid excessive seeks, the file system may be involved in coordinating such multiple shrink operations.

The Prepare request takes in the desired size of the new volume in sectors. NTFS blocks further allocations outside of the new volume boundary. The Prepare request does not verify if the volume can actually be shrunk by the specified amount. However, the prepare request may do some simple verification of the input arguments. For example, the request will fail during prepare if the desired shrink amount is greater than the total number of clusters in the volume. Prepare will also fail if there is already another shrink request made on the volume.

After a Prepare request has been made, there is a possibility that the application which requested the shrink closes unexpectedly before sending either a commit or abort. The file system ties the shrink volume request with the application's handle. If the handle goes away, the file system will treat such a state as an abort.

Prepare may be called multiple times on the same handle with different values for the number of clusters to reclaim. A request to prepare may not return any output.

With respect to commit, the commit request takes no input. The file system tries to remove the number of clusters specified by the most recent Prepare request, and will verify that there are no allocated clusters in the shrink region before shrinking the file system. If there are allocated clusters in the shrink region, the Commit request will fail. A failed commit returns the volume to the prepared state, that is, it leaves the boundary in place so that the caller can adjust and try again. A request to Commit may not return any output.

An Abort request removes the volume allocation lock which was instantiated by the Prepare request. A request to Abort may not return any output.

Access Rights:
SE_MANAGE_VOLUME_PRIVILEGE should be held by caller.

Volsnap
The following two IOCTLs may be implemented in Volsnap to support the shrink operation:

---
IOCTL_VOLSNAP_QUERY_MINIMUM_SHRINK_SIZE
---

```
    Input
None
    Output
        typedef struct _VOLSNAP_VOLUME_SIZE {
            LONGLONG        VolumeSize;
        } VOLSNAP_VOLUME_SIZE,
        *PVOLSNAP_VOLUME_SIZE;
```

Description
This IOCTL returns the LCN of the cluster with the greatest LCN that is occupied by a differential area file.

Access Rights
Read access. Only administrators can use this IOCTL.

---
IOCTL_VOLSNAP_PREPARE_FOR_SHRINK
---

```
    Input
        typedef struct _VOLSNAP_VOLUME_SIZE {
            LONGLONG        VolumeSize;
        } VOLSNAP_VOLUME_SIZE,
```

-continued

```
        IOCTL_VOLSNAP_PREPARE_FOR_SHRINK

*PVOLSNAP_VOLUME_SIZE;
        Output
        None
```

The IOCTL_VOLSNAP_PREPARE_FOR_SHRINK IOCTL forces the copy of free clusters in the shrink region that contain deleted files into the differential area file for a snapshot. The shrink region may be determined by all clusters with LCN greater than the inputted shrink boundary LCN.

Volsnap verifies that there are no clusters allocated to differential area files greater than the inputted LCN before it begins the copying of deleted clusters to the differential area. This IOCTL can fail if there is not enough free space left in the remaining volume to copy all the deleted files in the shrink region into the differential area. In this case, the process may consider trying to return the amount of space necessary for the call to succeed so that the user can re-try the IOCTL with a shrink boundary that should succeed, e.g., instead of retrying in a loop.

This IOCTL could potentially be a lengthy operation and therefore may be cancelable.

Access Rights

Read and write access. Only administrators can use this IOCTL.

With respect to VDS Providers, once the commit succeeds, the VDS 312 calls into the provider to shrink the volume. For basic volumes, the basic provider will issue IOCTL_DISK_GROW_PARTITION to the volume manager (which forwards it to the partition manager). It accepts the following parameter(s):

```
        typedef struct _DISK_GROW_PARTITION {
            ULONG PartitionNumber;
            LARGE_INTEGER BytesToGrow;
        } DISK_GROW_PARTITION, *PDISK_GROW_PARTITION;
```

BytesToGrow may be negative—i.e. the provider supplies (-NumberOfClustersRemoved*ClusterSize).

The partition manager shrinks the partition when this value is negative.

For dynamic volumes, the dynamic provider will issue IOCTL_VOLMGR_SHRINK_VOLUME to the volume. This accepts the following parameter(s):

```
        typedef struct _VM_SHRINK_VOLUME_INPUT {
            //
            // Pack id
            //
            // Note: The operation may not be supported on
            // foreign packs.
            GUID PackId;
            //
            // Volume id
            //
            GUID VolumeId;
            //
            // New volume length in bytes.
            //
            // It has to be less than the current length of the
            // volume.
            //
```

-continued

```
            ULONGLONG Length;
        } VM_SHRINK_VOLUME_INPUT,
         *PVM_SHRINK_VOLUME_INPUT;
```

DISKPART.EXE supports a new command named SHRINK. The volume to be operated selected in a typical manner, e.g.:

SHRINK [DESIRED=<Desired reclaimable bytes in MB>] [MINIMUM=<Minimum reclaimable bytes in MB>] [NOWAIT] [NOERR] SHRINK QUERYMAX If DESIRED/MINIMUM are not supplied, the command results in the code attempting to shrink to the best possible size (e.g., obtained via QueryMaxReclaimableBytes). If one value is supplied but not the other, the code assumes the other to be the same value.

By default, the call to Shrink may be synchronous and does not return until the entire shrink operation is complete. If it is not desirable to wait for the shrink to complete, the NOWAIT parameter can be specified, whereby the call returns asynchronously and shrink continues running. If QUERYMAX is specified, DiskPart displays an estimated maximum size that can reclaimed from the volume.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. At least one computer storage medium for implementing a method for online shrinking of a volume, the at least one computer storage medium having computer-executable instructions stored thereon, which, when executed at a processor, perform steps of the method, including:

accessing volume information for a volume, the volume information indicating that the volume is between a first boundary and a second boundary on a computer storage medium, the first boundary and second boundary defining the size of the volume;

receiving a request to shrink the volume, the request including a shrink boundary that is to be placed between the first boundary and the second boundary on the computer storage medium;

restricting allocations such that any new allocation is in an first area of the volume, the first area being the area between the first boundary and shrink boundary;

initiating moving volume data from a second area, the second area being the area between the shrink boundary and the second boundary, to the first area to create a shrink region between the shrink boundary and the second boundary, the shrink region representing freed up space that can be used for a new volume on the computer storage medium;

receiving a request for a new allocation subsequent to initiating and during the movement of volume data from the second area to the first area;

allowing the new allocation request to a location only in the first area during and in parallel with the movement of volume data from the second area to the first area; and committing the shrink when no volume data remains within the second area.

2. The at least one computer storage medium of claim 1 having further computer-executable instructions comprising, estimating whether sufficient space exists within the boundary to move the data.

3. The at least one computer storage medium of claim 2 wherein estimating whether sufficient space exists comprises locating any known unmovable files.

4. The at least one computer storage medium of claim 2 wherein estimating whether sufficient space exists comprises requesting that snapshot data not presently in a differential area be associated with the differential area.

5. The at least one computer storage medium of claim 4 wherein estimating whether sufficient space exists comprises factoring in a buffer to provide for differential area growth.

6. The at least one computer storage medium of claim 4 wherein estimating whether sufficient space exists comprises obtaining information from a volume snapshot mechanism corresponding to differential area size data.

7. The at least one computer storage medium of claim 1 wherein moving the volume data is performed asynchronously.

8. The at least one computer storage medium of claim 1 wherein the volume is shrunk to be at the front of a disk, by restricting the new allocations to be before the shrink boundary and moving the volume data from beyond the shrink boundary to before the shrink boundary.

9. The at least one computer storage medium of claim 1 having further computer-executable instructions comprising, creating at least one new volume and/or partition within the shrink region.

10. The at least one computer storage medium of claim 9 wherein one volume and/or partition is created at the end of a disk.

11. In a computing environment having at least one computing device, a system comprising:
 a processor;
 system memory; and
 at least one computer storage medium having stored thereon a shrink engine and a file system component, wherein the shrink engine is configured to:
  access volume information for a volume, the volume information indicating that the volume is between a first boundary and a second boundary on a computer storage medium, the first boundary and second boundary defining the size of the volume;
  receive requests to shrink volumes, the requests including a shrink boundary that is to be placed between the first boundary and the second boundary on the computer storage medium, placement of the shrink boundary resulting in a first area being the area between the first boundary and the shrink boundary and a second area being the area between the shrink boundary and the second boundary;
  initiating moving volume data from a second area to the first area to create a shrink region between the shrink boundary and the second boundary, the shrink region representing freed up space that can be used for a new volume on the computer storage medium; and
 wherein the file system component communicates with the shrink engine and the file system component configured to:
  allow allocations only in the first area while allowing read operations from any location of the volume and/or partition;
  move volume data from the first area to the second area;
  receive requests for new allocations subsequent to initiating and during the movement of volume data from the second region to the first region; and
  allow new allocation requests to a location in the first area during and in parallel with the movement of volume data from the second area to the first area; and
 wherein the shrink engine is further configured to commit shrinks when no volume data remains within the second area.

12. The system of claim 11 further comprising, a volume snapshot mechanism that communicates with the shrink engine and/or file system to preserve snapshot-related data.

13. The system of claim 11 wherein the shrink engine is further configured to cancel a shrink operation.

14. The system of claim 11 wherein the shrink engine if further configured to provide information corresponding to progress of moving the volume data from the second area to the first area.

* * * * *